United States Patent [19]

Viertel et al.

[11] Patent Number: 4,953,064

[45] Date of Patent: Aug. 28, 1990

[54] SUN VISOR FOR MOTOR VEHICLES

[75] Inventors: Lothar Viertel, Altforweiler, Fed. Rep. of Germany; Patrick Welter, Lachambre, France

[73] Assignee: Gebr. Happich GmbH, Fed. Rep. of Germany

[21] Appl. No.: 440,243

[22] Filed: Nov. 22, 1989

[30] Foreign Application Priority Data

Nov. 26, 1988 [DE] Fed. Rep. of Germany ....... 3839965

[51] Int. Cl.$^5$ .......................... F21V 33/00; B60J 3/00
[52] U.S. Cl. ...................... 362/74; 362/144; 296/97.5; 296/97.9
[58] Field of Search ............... 362/61, 74, 80, 135, 362/142, 144; 296/97.1, 97.5, 97.9, 97.12, 97.13

[56] References Cited

U.S. PATENT DOCUMENTS

| | | | |
|---|---|---|---|
| 3,405,969 | 10/1968 | Creel | 296/97.1 |
| 4,174,864 | 11/1979 | Viertel et al. | 362/144 |
| 4,272,118 | 6/1981 | Viertel et al. | 296/97.5 |
| 4,591,956 | 5/1986 | Majchrzak | 362/135 |
| 4,664,435 | 5/1987 | Dietz et al. | 296/97.1 |
| 4,679,843 | 7/1987 | Spykerman | 296/97.1 |
| 4,720,132 | 1/1988 | Ebert et al. | 362/144 |
| 4,740,028 | 4/1988 | Connor | 362/142 |
| 4,763,946 | 8/1988 | Robbins et al. | 296/97.1 |

FOREIGN PATENT DOCUMENTS

| | | |
|---|---|---|
| 0270505 | 6/1988 | European Pat. Off. ......... 296/97.12 |
| 2737215 | 4/1978 | Fed. Rep. of Germany . |
| 3008361 | 9/1981 | Fed. Rep. of Germany . |
| 230269 | 1/1987 | Fed. Rep. of Germany . |
| 2703447 | 8/1987 | Fed. Rep. of Germany . |

*Primary Examiner*—Stephen F. Husar
*Assistant Examiner*—D. M. Cox
*Attorney, Agent, or Firm*—Ostrolenk, Faber, Gerb & Soffen

[57] ABSTRACT

A sun visor body has at one end region of one of its longitudinal edges an outer-support pin which is surrounded by a sleeve and is detachably engageable in the mounting recess of an outer-support mount. The sleeve is comprised of two half-shells. Each shell has two longitudinal edges and each has a radially inwardly directed extension. The outer-support pin is provided with two diametrically opposite, axially extending grooves into which the extensions are snapped and held, secured against twisting and in non-losable fashion by engagement. The outer support pin may have an electrically conductive wire core. A rivet through the pin acts to electrically connect the core to the periphery of the pin where the rivet can connect to a contact in an outer support mount.

16 Claims, 2 Drawing Sheets

SUN VISOR FOR MOTOR VEHICLES

BACKGROUND OF THE INVENTION

The present invention relates to a sun visor for motor vehicles in which the sun visor body has an outer support pin at one end region of one of its longitudinal edges, which pin is surrounded by a sleeve and is adapted to be detachably received in a mounting receiver of an outer support mount of a vehicle.

THE PRIOR ART

A sun visor of this type is described, in German Published Patent Application OS 3,008,361. In that sun visor, the sleeve has a separation seam that extends longitudinally along the sleeve. That sleeve is mounted over an outer support pin, which has a cover foil welded around it. Such a sun visor has not been suitable in actual use. In addition to the difficulties in its manufacture with regard to the development of the closure and the ease of tearing of the film hinge, the sleeve has the undesired characteristic of twisting around the pin.

SUMMARY OF THE INVENTION

The object of the present invention is to develop the sleeve and the outer support pin which is surrounded by the sleeve to assure a dependable fusing of these parts to each other. Another object is to eliminate twisting of the sleeve around the pin. A further object is to obtain a particularly inexpensive manufacture and assembly procedure and a particularly good appearance.

These objects are achieved with the present invention. The sleeve is comprise of two half-shells. Each of the longitudinal edges of the shells has a radially inwardly directed, hook-like extension. The outer support pin is provided with at least two diametrically opposite grooves in which the hook-like extensions are engageable through the resilient sleeve shells being pushed onto the pin and the extensions being snapped into the grooves The production of grooves in the outer support pin does not impose an additional expense since they can be produced readily upon the initial shaping and manufacture of the outer support pin.

The sleeve half shells are simple and inexpensive to manufacture. They usually are of identical construction. In order to assemble the device, the half-shells are merely placed one after the other on the outer support pin. That pin has been previously freed of a cover foil or was free of any cover foil from the start. The hook-like extensions of the sleeve are then snapped by slight pressure into the grooves of the outer support pin. A fully reliable fastening of the sleeve on the outer support pin is assured by the present invention.

As a further development, the sleeve comprised of two half-shells can have a goblet-shaped widening at both opposite end regions. This provides a covering of foil together with a smooth transition into the ends of the outer support. This enhances the appearance and can be obtained in a simple manner. This is particularly useful because the outer support pin is positioned in and extends across a depression in the longitudinal edge of the visor body and the ends of the sleeve thereby smoothly merge into the visor body.

The half-shells are preferably developed as plastic injection moldings which affords inexpensive manufacture. This has the advantage of flexibility with respect to color through the use of color plastics.

In a preferred embodiment of the invention, the outer support pin comprises a core of electrically conductive material and a plastic body which surrounds the core and has the longitudinal grooves formed in it. That core is electrically connected to the periphery of the shell. Specifically in this construction, one half-shell, the plastic body and the core are jointly traversed radially by at least one bore hole. An electric contact rivet is anchored in the bore hole. The outer end of the rivet has an arcuate contact plate which rests against the periphery of half-shell that is provided with the hole. The core is also electrically connected with an electric load which is arranged in the sun visor body. The contact plate is adapted to be contacted by a mating contact which is provided in the outer support mount and is connected to the electrical system of the motor vehicle. The contact plate may, for instance, be comprised of brass. The plastic body, which is provided with the grooves, can be formed by molding around the core.

In addition, the half-shell which has the hole may have a recess which is adapted to the dimensions of the contact plate and into which the contact plate is countersunk therein by its bottom and thus has a real contact.

In a further development of the invention, the free end of the contact rivet is squashed together at the outlet end of the bore hole in the plastic body or is bulged to form a rivet head which engages into the hole, and the end of the contact rivet which is deformed in this manner is covered by the second half-shell.

This preferred embodiment of the present invention relatively simply enables providing electricity to an electric load in the sun visor body. One such device may be an illuminating device which makes it possible to use the present invention on a sun visor body, even in the dark. The prior art, for instance, German Application OS 2 703 447, on the other hand, teaches a substantially more expensive solution for supplying electricity to an electric load in the sun visor body.

The foregoing and other objects and features of the present invention will become apparent from the following description of the invention which refers to the accompanying drawings.

DETAILED DESCRIPTION OF A PREFERRED EMBODIMENT

Figure 1:
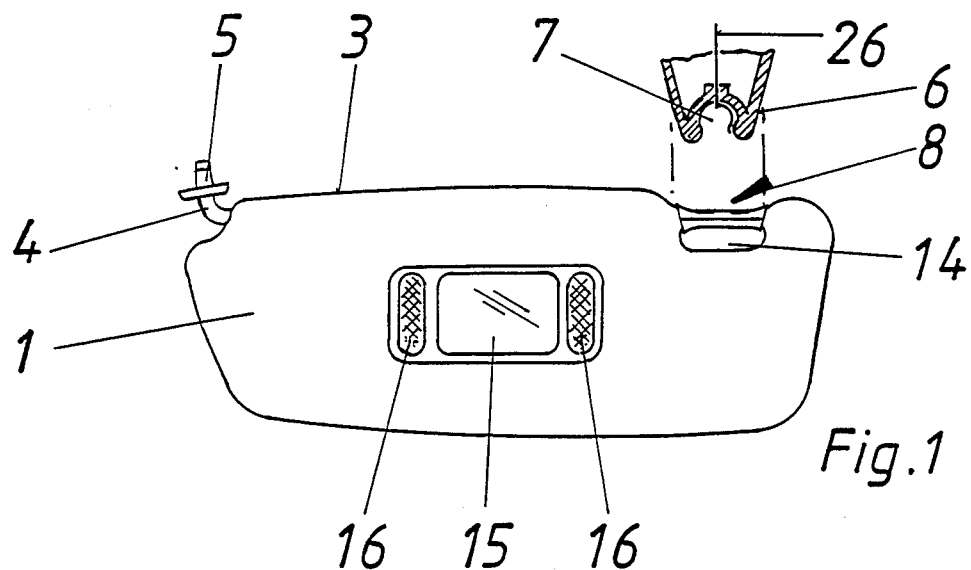
FIG. 1 is a front elevation of a complete sun visor.

Referring to FIGS. 1 through 4, the sun visor of the invention has a sun visor body 1 of approximately rectangular contour and flat shape and it is developed as a cushioning body. In its interior, the sun visor body 1 is stiffened by a reinforcement insert 2 (FIG. 3) formed, for instance, of stiff wire. In the region of its upper longitudinal edge 3, toward one side end, the sun visor body 1 has a swivel-mounting shaft 4 of approximately L shape. One arm of the L is incorporated in the sun visor body 1, while the other arm is seated in a swivel mount 5 which is adapted to be fastened to the body of a motor vehicle.

Toward the opposite end of the visor body, also in the region of the upper longitudinal edge 3, there is an outer support. It comprises an outer-support mount 6 (shown turned 90° in FIG. 1) adapted to be fastened to the body of the motor vehicle and of an outer-support pin 8 on the sun visor body which is detachably engageable in the mounting recess 7 of the mount 6. The outer-support pin 8 is arranged in line with the arm of the swivel-mounting shaft 4 which is seated in the sun visor body 1 to form with it a common swing axis for the sun visor body between the out-of-use and the use positions.

The outer-support pin 8 is surrounded by a sleeve 9 comprised of two half-shells 10. Each shell has longitudinal edges and each edge has at it a radially inwardly directed hook-like extension 11. The hook-like extensions 11 on each half shell engage into two diametrically opposite, axially extending grooves 12 which are provided in the periphery of the outer-support pin 8 for securing the half-shells 10 of the sleeve 9 in secure, non-losable fashion on the outer-support pin 8.

The two opposite end regions of the sleeve 9 are widened in a goblet shape. This makes it possible to grip over the cover foil stumps 13 of the cover foil which customarily surrounds the sun visor body 1 and provides a smooth transition (see, in particular, FIG. 3) into the outer-support eye or depression 14 into the upper longitudinal edge which is traversed by the outer-support pin 8. The hook-like extensions 11 on the half-shells 10 terminate before the goblet-shaped widenings and before the cover-foil stumps 13 and are adapted in their length to the axial length of the grooves 12.

Figure 2:
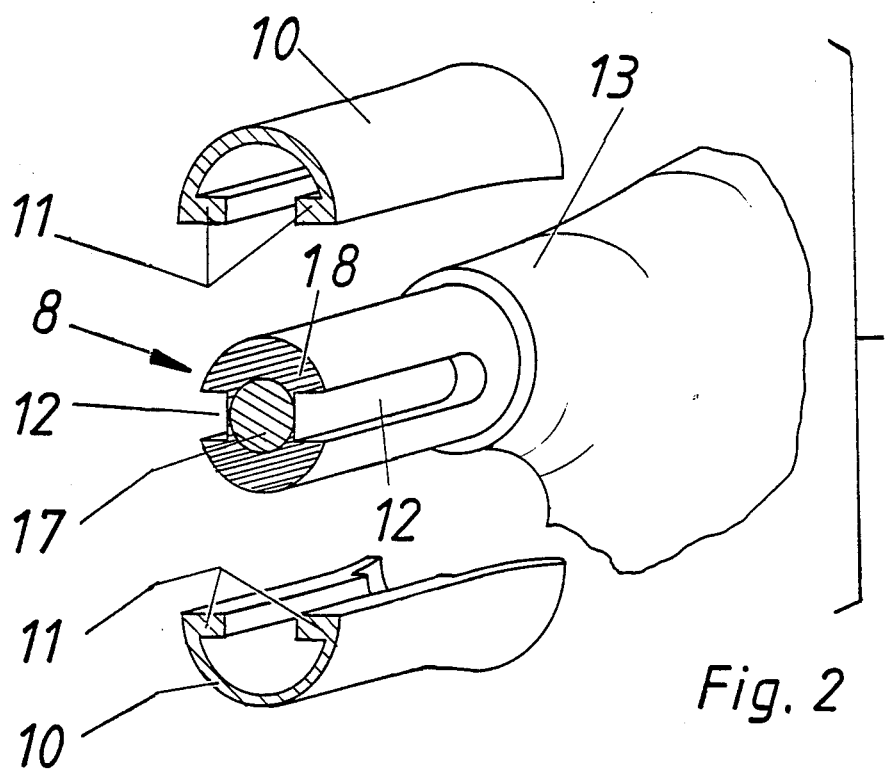
FIG. 2 is a partial expanded view in perspective of the area of the outer support of the sun visor of FIG. 1 which has sleeve half-shells.
Figure 4:
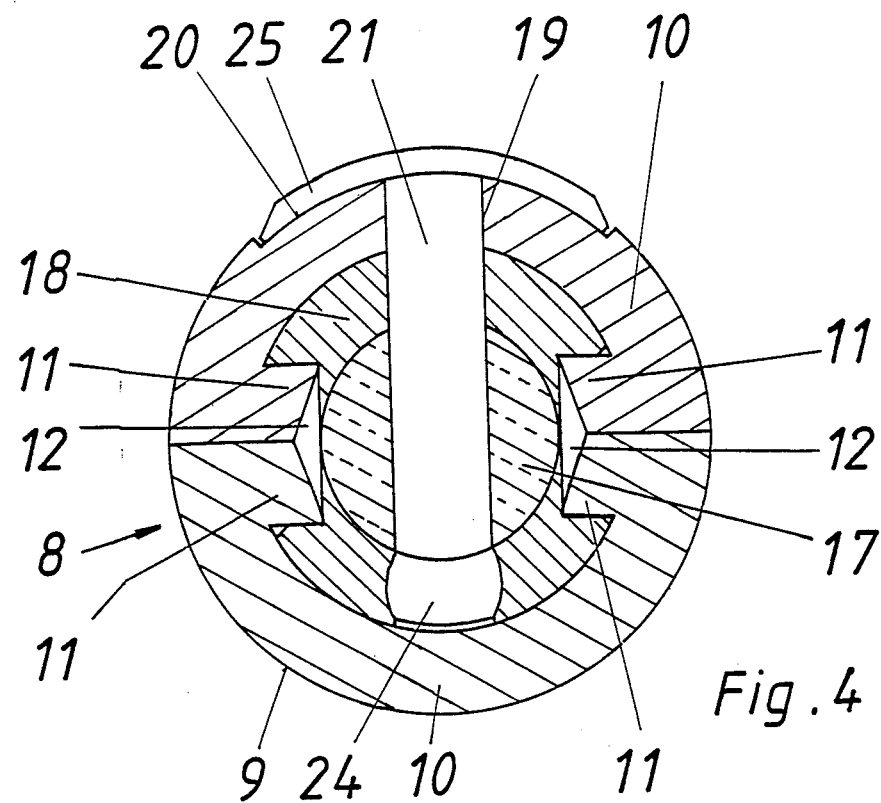
FIG. 4 is a sectional view taken along line 4—4 of FIG. 3.

In sun visors which are developed without an electric load, such as a source of light, the half-shells 10 of each sleeve 9 are identical in shape, as shown in FIG. 2.

Assembly is now described As shown in FIG. 2, the outer-support pin 8 is first freed of the covering foil which is normally present. An upper or lower half-shell 10 is then placed on the outer-support pin 8. By exerting radially directed pressure on the half-shell, the extensions 11 are snapped into the grooves 12 and are engaged there The same procedure is then carried out with the second half-shell 10.

Figure 3:
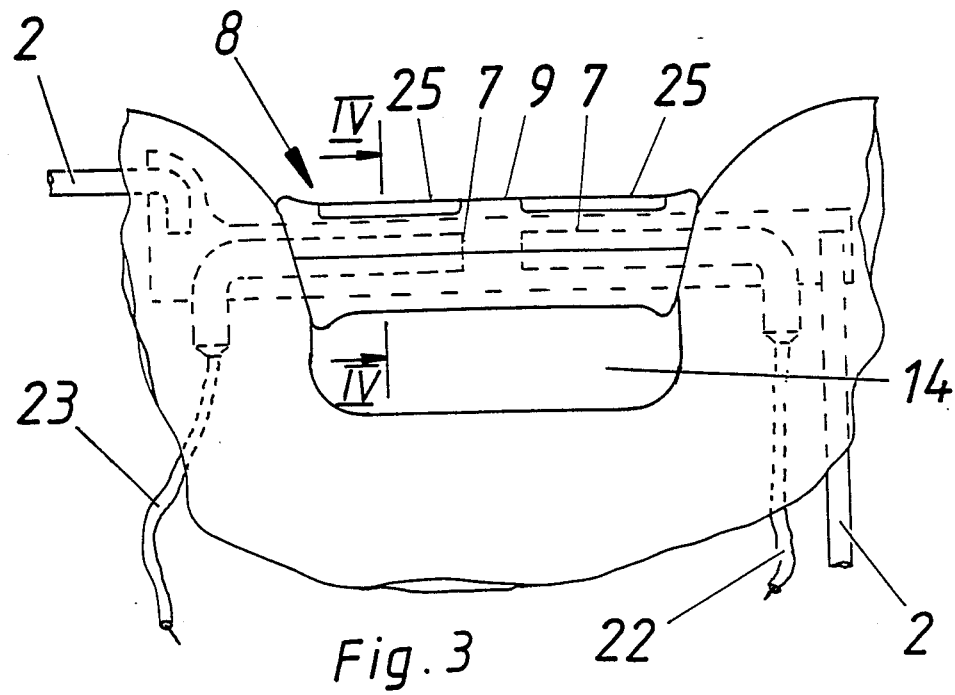
FIG. 3 is an elevation partly in section of the sun visor of FIG. 1 with electrical contact elements shown.

Some sun visors are equipped with an illuminating device. In FIG. 1, for example, light windows 16 of an illuminating device are arranged alongside a mirror 15. When the visor carries such an electric load, both the outer-support pin 8 and one of the half-shells 10 are modified as compared with the normal development. The modification may be used even for a visor without an electric load. The outer-support pin 8 then comprises a core 17 of electrically-conductive material, for example a wire of brass, and a plastic body 18 which surrounds the core and in the periphery of which the grooves 12 are formed. To one end of the core 17 an electric wire 22 is connected, for instance by soldering. It leads to the source of light in the sun visor body 1. If the core 17 is interrupted in its center, as shown in FIG. 3, each section of the core can be provided with a respective electric wire 22 and 23 (positive pole/negative pole).

The plastic body 18 is formed by injection molding around the core 17 and is preferably connected by such molding to the reinforcement insert 2. One half-shell 10, and particularly the upper one, has at least one (two in the embodiment shown) radial bore hole 19 through it and also has a recess 20 on the outside of the shell and around the hole 19. The hole 19 and the recess 20 can be produced through appropriate development of the mold for the production of the half-shells so that no subsequent formation work is necessary for this. The hole 19 continues through the plastic body 18 and through the core 17.

The hole 19 receives and anchors a contact rivet 21. The contact rivet 21 is bulged at the hole outlet end of the hole in the plastic body 18 so as to form a rivet head 24. At its other end, the contact rivet 21 is provided with an arcuate contact plate 25 which engages and is partially countersunk in the recess 20 on the outside of the upper half-shell.

Upon assembly of the sun visor body, the upper half-shell 10 which is provided with the hole 19 and the recess 20 is first snapped in place on the plastic body 18. The hole 19 is then lengthened and displaced through the plastic body 18 and core 17. The contact rivet 21 is introduced into the hole 19 and is deformed at its free end to form the rivet head 24. The second lower half-shell 10 is then snapped into place on the outer-support pin 8 around its plastic body 18, and the rivet head 24 is at the same time covered. FIG. 3 shows the assembled condition.

If, as shown in FIGS. 1 and 3, both positive and negative terminals are to be electrically connected over the outer support, two corresponding mating contacts 26 (FIG. 1) are provided in the outer-support mount 6. The contact plates 25 of the two rivets 21 and the mating contacts 26 are so placed and are of such arcuate lengths that they only contact each other when the sun visor body 1 is in its downwardly swung position of use. Otherwise, the electric current supply of the source of light, or the like load in the sun visor body 1, functions in the manner already described in German Application OS 2,703,477, so that it is not necessary to describe it in detail here.

In the foregoing, the present invention has been described in connection with a preferred illustrative embodiment thereof. Since many variations and modifications of the present will now be obvious to those skilled in the art, it is preferred that the scope of this invention be determined not by the specific disclosures herein contained but only by the appended claims.

What is claimed is:

1. A sun visor body for motor vehicles, wherein the motor vehicle has on its interior above its windshield an outer support mount with a mounting recess; the visor body having:

a plurality of longitudinal edges; one of the longitudinal edges of the sun visor body having an outer support pin, a sleeve surrounding the pin and adapted to be engaged detachably into the mounting recess in the outer support mount;

the sleeve comprising two half-shells which together surrounding the pin and extend along the pin; each half shell having opposite, second, longitudinal edges, and each second longitudinal edge has a radially inwardly directed extension;

the outer support pin having axially extending grooves in its periphery shaped and placed to receive the extensions for holding the half shells to the pin.

2. The sun visor body according to claim 1, wherein the axially extending grooves are diametrically opposite around the outer support pin.

3. The sun visor body according to claim 1, wherein the sleeve comprised of two half-shells has a widening shape toward its opposite ends.

4. The sun visor body according to claim 1, wherein the sun visor body has a depression defined into the one longitudinal edge and the outer support pin extends across that depression.

5. The sun visor body according to claim 4, wherein the sleeve comprised of two half-shells has a widening shape toward its opposite ends, the widening shapes merge into the visor body at the opposite sides of the depression.

6. The sun visor body according to claim 1, wherein the shells are of resilient material, enabling the shells to flex to be installed on the outer support pin and enabling the radial extensions to snap into the qrooves in the outer support pin.

7. The sun visor according to claim 2, wherein the half-shells are plastic injection moldings.

8. The sun visor according to claim 1, wherein the outer-support pin comprises a core of electrically-conductive material and a plastic body which surrounds the core, the grooves being defined in the plastic body;

one of the half-shells, the plastic body and the core being traversed by at least one bore hole, a contact rivet anchored within the hole, the rivet having at one end an arcuate contact plate which rests against the one half-shell which is provided with the hole;

the core being electrically connected to an electric load arranged in the sun visor body, and the contact plate being shaped, positioned and adapted to make contact with a mating contact which is provided in the outer-support mount and is connected to the electrical system of the motor vehicle.

9. The sun visor according to claim 8, wherein the one half-shell which has the hole has a recess around its periphery which is generally adapted to the dimensions of the contact plate and into which the contact plate engages partially countersunk by its bottom and thus areally.

10. The sun visor body according to claim 9, wherein the contact rivet has a free end that is deformed at the outlet end of the hole of the plastic body to form a rivet head which engages in the hole, and the deformed contact-rivet end is covered by the second half-shell.

11. In combination, the sun visor body according to claim 8, and an outer support mount including the mounting recess in which the shells are removably received;

electrical contacts in the mounting recess shaped for electrically contacting the contact plate when the visor body is oriented only in predetermined tilted orientations with respect to the vehicle interior.

12. In combination, the sun visor body according to claim 1, and an outer support mount including the mounting recess in which the shells are removably received.

13. The sun visor body according to claim 1, further comprising a swivel mount for the visor body located along the one longitudinal edge and away from the outer support mount, whereby the visor body may be swiveled to different tilt orientations around an axis defined jointly by the swivel mount and the outer support mount.

14. The sun visor body according to claim 8, further comprising a swivel mount for the visor body located along the one longitudinal edge and away from the outer support mount, whereby the visor body may be swiveled to different tile orientations around an axis defined jointly by the swivel mount and the outer support mount.

15. The sun visor according to claim 1, wherein the outer-support pin comprises a core of electrically-conductive material and a plastic body which surrounds the core, the grooves being defined in the plastic body; an electric contact extending from the core outward to the periphery of the shells of one of the sleeve.

16. The sun visor according to claim 15, further comprising an electric load in the visor body and the core being electrically connected to the load.

* * * * *